United States Patent Office 3,565,658
Patented Feb. 23, 1971

3,565,658
CARBON BLACK DISPERSING AGENT
Arthur E. Frazier and Robert E. Dollinger, Phillips, Tex., assignors to Phillips Petroleum Company, a corporation of Delaware
No Drawing. Filed July 19, 1968, Ser. No. 745,960
Int. Cl. C09c 1/56, 3/00
U.S. Cl. 106—307    7 Claims

ABSTRACT OF THE DISCLOSURE

A material which acts both as a pelleting agent and a dispersant for carbon black in rubber which comprises a polyethoxylated amine contained in carbon black in the amount of about 0.1 to about 10%.

---

This invention relates to dispersing agents.

One of the more specific aspects of this invention relates to dispersing agents for carbon black.

In conventional carbon black manufacture, the carbon black is usually pelleted. Accordingly, the use of pelleted carbon black, for example, in rubber, generally involves not only the pulverization of the carbon black pellets but dispersal of the carbon black throughout the rubber compound. Inasmuch as pelleting is generally facilitated by use of a pelleting agent, it is advantageous to use as a pelleting agent a material which also facilitates the dispersal of the carbon black in the rubber compound.

In accordance with this invention, there is provided a material which acts both as a pelleting agent and as a dispersing agent and which comprises an aqueous solution of about 0.05% to about 5% of a polyethoxylated amine.

Accordingly, it is an object of this invention to provide an improved dispersing agent.

It is another object of this invention to provide an improved agent for pelleting carbon black and facilitating the dispersing of carbon black in rubber compounds.

In general, polyethoxylated amines have the general formula

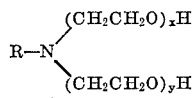

in which the total moles of ethylene oxide, that is, the sum of $x$ and $y$, varies between about 2 and about 50. Such materials usually have a molecular weight from about 280 to about 2500, a specific gravity from about 0.875 to about 1.12 and may be either solids or liquids. The alkyl radical, R, is generally derived from the coco amine, the soybean amine, the tallow amine, the oleyl amine, or the stearyl amine.

One of the more effective of these compounds is known commercially as "Ethomeen C/12"[1] and has a total of 2 moles ethylene oxide, that is, $x+y$ are equal to 2. This compound has an average molecular weight of approximately 285, a specific gravity, 25°/25° C., of approximately 0.875, and is a liquid. The alkyl radical is derived from the coco amine.

Another of these compounds which has been found particularly effective is known commercially as "Ethomeen 18/60"[1] in which the moles of ethylene oxide, $x+y$, are equal to about 50. This compound has an average molecular weight of approximately 2485, a specific gravity of about 1.12, and is a solid.

Another of these compounds which has been found effective is "Ethomeen 18/12"[1] in which the moles of ethylene oxide, $x+y$, are equal to 2. This compound has an average molecular weight of about 365, a specific gravity of approximately 0.96, the alkyl radical being derived from stearyl amine, the material having the consistency of soft paste.

Still another of these compounds which has been found commercially as "Ethomeen C/12"[1] and has a total of of ethylene oxide, $x+y$, are equal to 15. The compound has an average molecular weight of about 1050, a specific gravity of 1.1, the alkyl radical being derived from the coco amine, the material having the consistency of soft paste.

These compounds are commercially available.

When compounds such as the aforementioned are used in the pelleting process, they will normally be added to the carbon black in amounts from about 0.05% to about 5% of the weight of the wet pellet prior to the drying of the pellet, the drying removing the principal portion of the moisture incorporated in pelleting. Preferably, the additives will be added in amounts from about 0.1 to about 0.75 weight percent of the pellet on a wet basis.

Accordingly, the additives will be contained in the carbon black in an amount from about 0.1% to about 10% of the weight of the carbon black pellet on a dry basis.

These compounds may be added directly to any medium, such as water, which is used in pelleting the carbon black or may be added with any of the conventional pelleting agents such as molasses, nitric acid, and the like. Generally, these additives are effective in mixtures of any conventional pelleting liquids.

If added to the rubber in which the carbon black is dispersed, the dispersing agents will be added in approximately the same percentages as used in the wet pelleting process. The above compounds can be used with all types of blacks including channel, furnace and thermal blacks. These agents particularly facilitate dispersion of those blacks difficult to disperse, that is, the low structure blacks. These agents can also be used with large particle and small particle size blacks; in fact, the entire range of blacks commercially available are advantageously processed with these compounds.

In order to comparatively evaluate these additives, rubber formulations were prepared to which were added dried carbon black pellets, pelleted by the used of the additives. Ratings between these additives and other additives were made by the photographic technique as described by N. A. Stumpe, Jr., and H. E. Railsback in "Carbon Black Dispersion-Photographic Technique and Rating System," Rubber World, 151, No. 3, 41 (1964).

Five standard stocks were mixed in a B-Banbury mixer using the following recipes:

| | | | | | |
|---|---|---|---|---|---|
| SBR–1500 | 100 | 100 | 100 | 100 | 100 |
| Philrich 5 [1] | 0 | 15 | 30 | 45 | 60 |
| Zinc stearate | 4 | 4 | 4 | 4 | 4 |
| Flexamine | 1 | 1 | 1 | 1 | 1 |
| Sulfur | 1.67 | 1.92 | 2.17 | 2.42 | 2.67 |
| NOBS Special | 1 | 1.15 | 1.30 | 1.45 | 1.60 |

[1] Trademark—Phillips Petroleum Company.

In the above formulation, the styrene-butadiene rubber-1500 (SBR–1500) was a random copolymer rubber, well known in the art. Zinc stearate was used instead of zinc oxide to eliminate any effects of the latter on dispersion. The "NOBS Special" is N-oxydiethylene-2-benzothiazyl sulfenamide.

The Flexamine of the above formulation is a physical mixture comprised of about 65% of a complex diarylamine-ketone reaction product and about 35% of N,N'-diphenyl-p-phenylenediamine.

In each instance, the carbon black, as produced by the furnace process, had been pressed to a density of about 12–13 pounds per cubic foot and pelleted, the additive ---
[1] Trademark—Armour Industrial Chemical Co., Chicago, Ill.

having been added to the water employed in pelleting to the extent hereinafter indicated. After the pelleting, the pellets were dried to a water content of from 0 to about 0.2 part by weight in about 56 parts of carbon black, depending upon the amount of water used in the pelleting process. Normally, the amount of water in the undried pellet, as formed, will be from about 30 to about 60 weight percent of the pellet, depending upon the type of black involved.

To prepare the various dispersions, 17.5 parts by weight of black were slowly added to 35 parts by weight of each gum masterbatch in a Brabender Plastograph, operating at 30 r.p.m. and 80° C. The addition was completed in about one minute. The ram was then inserted in the mixing head and the batch was mixed for about seven minutes at 70 r.p.m.

The batch was dumped to form a rectangular slab which was cured for 30 minutes at 153° C. The dispersion rating was then determined by the aforementioned photographic method.

Each dispersion was rated by four observers and the results were averaged. Results were then plotted relating rating to the amount of oil added. From each plot, the amount of oil added to give a dispersion rating of 6.6 was read, this rating being intermediate between "good" and "fair," and of acceptable commercial quality and being indicative of the amount of oil which could be tolerated in the batch.

The comparative results are shown in Table I below. Each additive has been assigned an "oil tolerance" rating determined by the above method, the higher the oil tolerance rating, the better the dispersion capabilities of the additive.

TABLE I

| Sample No. | Additive | Percent additive | Wgt. percent water in Wet pellet | Oil tolerance rating |
|---|---|---|---|---|
| 1 | None | 0 | 44 | 19 |
| 2 | Cat-Floc | 0.05 | 44 | 26 |
| 3 | do | 0.2 | 44 | 29 |
| 4 | do | 0.5 | 44 | 24 |
| 5 | Coagulant Aid No. 227 | 0.2 | 44 | 10 |
| 6 | Coagulant Aid No. 228 | 0.2 | 44 | 17 |
| 7 | Coagulant Aid No. 226 | 0.2 | 44 | 18 |
| 8 | Coagulant Aid No. 225 | 0.2 | 44 | 28 |
| 9 | Binding aid | 0.2 | 44 | 14 |
| 10 | do | 0.5 | 44 | 19 |
| 11 | do | 0.5 | 44 | 20 |
| 12 | Cat-Floc | 0.2 | 52 | 38 |
| 13 | Distilled water | 0 | 52 | 35 |
| 14 | Ethomeen 18/60 | 0.2 | 44 | 46 |
| 15 | Ethomeen C/12 | 0.2 | 44 | 48 |
| 16 | Ethomeen 2C/25 | 0.2 | 44 | 32 |
| 17 | Ethomeen 18/12 | 0.2 | 44 | 32 |

Cat-Floc: organic polymeric cationic coagulant, Calgon Corp., Pittsburgh, Pa.
Coagulant Aids, Nos. 225–228: Calgon Corp., Pittsburgh, Pa.
Binding aid: Protein Colloid, Swift & Co., Chicago, Ill.

The above data indicate that the polyethoxylated amine additives as indicated by sample numbers 14 through 17 gave improved results over commercially acceptable dispersants when used within the aforestated ranges of concentration and water percentages, even when such agents were employed as pelleting agents. The use of these additives resulted in the production of carbon black pellets commercially acceptable in all other aspects, particularly in respect to bulk density and oil absorption. Also, while not shown by these data, it can be concluded that the use of the additives of this invention, in the amounts and methods previously described, with distilled water as the aqueous medium, rather than commercially-available water, will result in further improvement over those set forth above.

It will be understood that various modifications can be made to the invention and its use as disclosed herein. However, such are to be considered as within the scope of the invention.

What is claimed is:

1. In the process for producing pelleted carbon black in which flocculant carbon black is pelleted in contact with a pelleting agent to produce wet pellets which are subsequently dried, the improvement comprising employing as said pelleting agent essentially a polyethoxylated amine having the formula

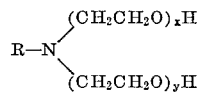

wherein R—N< is the residue of an amine, $RNH_2$, selected from the group consisting of the coco amine, the soybean amine, the tallow amine, the oleyl amine and the stearyl amine and in which formula the sum of $x$ and $y$ represents the total moles of ethylene oxide, said sum being from about 2 to about 50, said pelleting agent being employed as an aqueous solution in sufficient quantity to pellet the black.

2. The process defined in claim 1 in which said pelleting agent is employed in said aqueous solution in an amount of about 0.05 to about 5 weight percent of said solution.

3. The process defined in claim 2 in which said aqueous solution comprises demineralized water.

4. A carbon black composition comprised essentially of carbon black in pelleted agglomeration and the pelleting agent defined in claim 1.

5. The process as defined in claim 1 in which said wet pellet comprises from about 44 weight percent water and has an oil tolerance rating of from about 32 to about 46 when dried.

6. A carbon black composition comprised essentially of carbon black in pelleted agglomeration, water and the pelleting agent defined in claim 1.

7. The carbon black composition defined in claim 4 which has an oil tolerance rating of from 32 to about 46.

References Cited

UNITED STATES PATENTS 3,014,810   12/1961   Dybalski et al. _____ 106—308N

FOREIGN PATENTS 1,080,115   8/1967   Great Britain _____ 106—308N
1,295,383   5/1962   France _____ 106—307

TOBIAS E. LEVOW, Primary Examiner

H. M. S. SNEED, Assistant Examiner

U.S. Cl. X.R.

106—308; 264—117